Nov. 12, 1929.     J. SNEED     1,735,139
BRAKING DEVICE
Filed Aug. 1, 1927
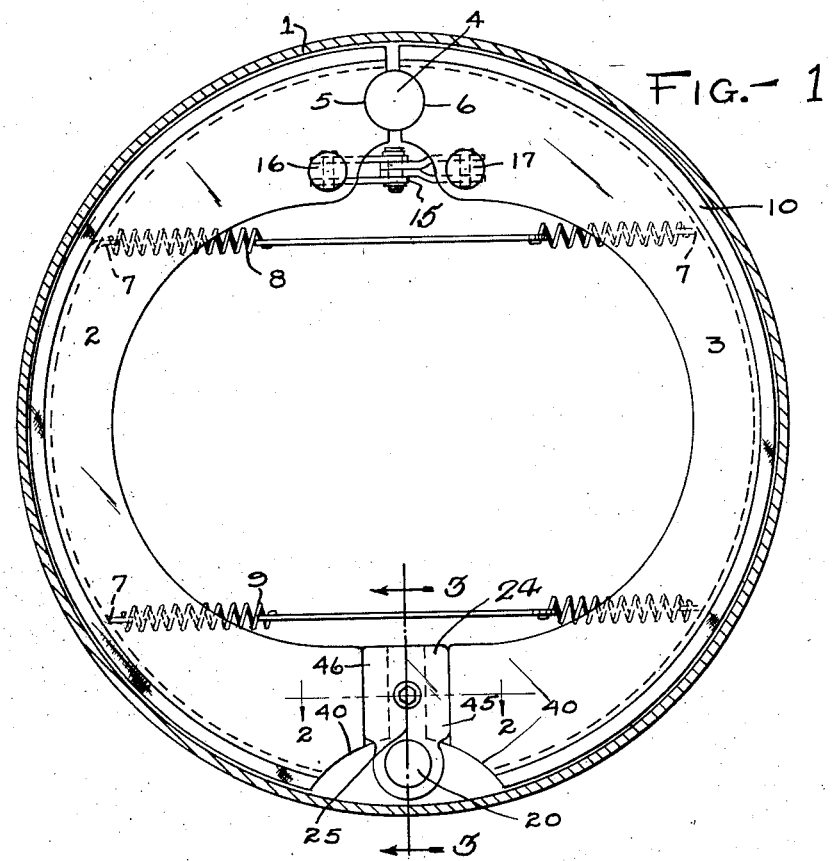
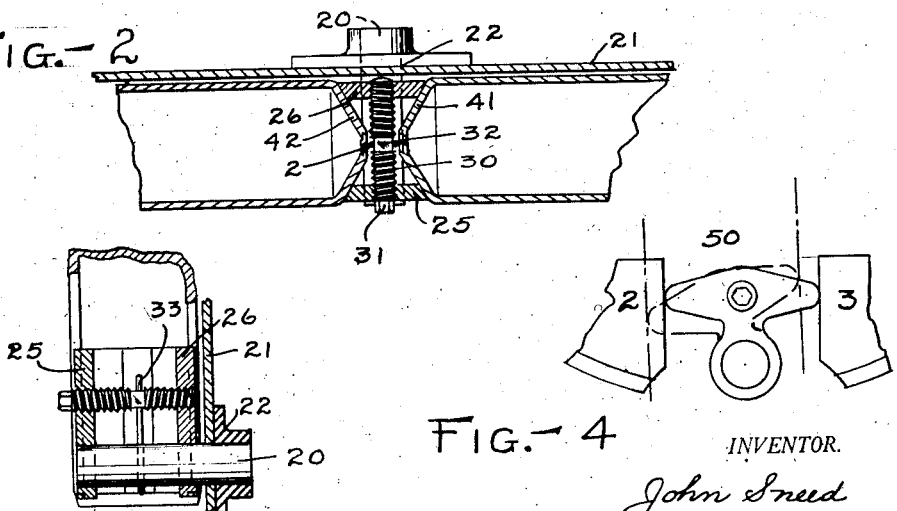
INVENTOR.
John Sneed
BY
Bates, Macklin, Golrick & Teare
ATTORNEYS Patented Nov. 12, 1929

1,735,139

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

BRAKING DEVICE

Application filed August 1, 1927. Serial No. 209,684.

This invention relates to automobile brakes and more particularly to a plural shoe brake and a device for transmitting force from one shoe to another and for adjusting the shoes.

It is among the objects of my invention to provide a self-energizing brake which will be equally effective regardless of the direction of drum rotation, and in which the degree of self-energization may be varied or controlled by the design of a small removable element. Another object is to provide a simple means for adjusting the clearance between the brake shoes and the drum. A further object is to make the shoe structure both rugged and economical.

Other objects will appear from the following detailed description of a preferred form of my invention. The essential characteristics are summarized in the claims.

In the drawing, Fig. 1 is an elevation of the assembled shoes with relation to the drum; Fig. 2 is a section taken along the line 2—2 on Fig. 1; Fig. 3 is a section taken along the line 3—3 of Fig. 1 and Fig. 4 is a modified form of the floating cam shown in Fig. 1.

Referring to Fig. 1, I show the usual brake drum 1 within which is mounted brake shoes 2 and 3. An anchor pin 4 may be suitably mounted on a backing plate and may receive the ends of the shoes 2 and 3 on arcuate bearing surfaces, as at 5 and 6. The shoes may be channelled in cross-section and may have tangs 7 punched in the lining supporting surface to which suitable retracting springs 8 and 9 may be connected. A brake lining 10 may be secured to the shoes in the usual manner. A shoe expanding device 15 is shown comprising a floating toggle which may be actuated by means not shown, and which is universally connected through pins 16 and 17 which are mounted in the side flanges in the ends of the shoes 2 and 3 respectively. Such an expanding device is shown in greater detail in my copending application, Serial Number 209,686, filed August 1st, 1927.

Opposite the anchor pin 4, I provide another pin 20 (see also Fig. 3) which is secured to the backing plate 21 with a suitable bracket 22. On this pin is pivotally mounted a rocking cam 24 which may comprise two plates 25 and 26. Threaded in both these plates is a combined right and left hand screw 30 which has a head 31 and a central square shank 32. The plates 25 and 26 may be drawn together or forced apart by turning the screw 30. A clip 33 (see Figs. 2 and 3) engages the square central shank of the screw to lock it in adjusted position.

The unanchored ends of the channeled shoes 2 and 3 are cut away from the drum as at 40 and are turned inwardly to form complementary beveled surfaces as at 41 (see Fig. 2). The sides of the plates 25 and 26, which comprise the floating cam, are suitably beveled for engagement with the inturned ends of the side flanges, as at 41. It will be seen from the foregoing that the screw 31 may be turned to draw the plates 25 and 26 together so that the free ends of the shoes 2 and 3 are forced away from each other to occupy a greater circumferential dimension to adjust the shoes or compensate for wear of the brake lining.

In operation of the brake, the anchored ends of the shoes are spread by the toggle 15 and when the drum rotates in a clockwise direction, the shoes will be urged clockwise so that the shoe 2 engages the anchor pin 4 along the bearing surface 5 and the shoe 3 acts as a servo shoe for the shoe 2. As the shoes move circumferentially in a clockwise direction, the cam 24 is rotated counter-clockwise, about the pin 20. As the cam rotates counter clockwise, it is engaged by the shoe 3 near the point 45 and engages the shoe 2 near the point 46, (see Fig. 1). The shoe 3 therefore delivers a circumferential or wrapping force to the shoe 2 through a reduced leverage so that a tempered or modified servo effect results.

Referring however, to Fig. 4, I have shown a modified cam shape 50 wherein the initial ratio of force delivered from the shoe 3 to the shoe 2 will be substantially one to one, but it will be apparent that after a slight rocking movement of the cam, as illustrated in dotted lines on Fig. 4, that the mechanical advantage is increased in favor of self-energization so that an increasing force will be delivered by the servo shoe to the served shoe.

Other modifications of the cam shape may be designed for any desired result.

Other modifications will appear to one skilled in the art without departing from the spirit of my invention. I have illustrated preferred forms in the accompanying drawings, but I do not care to be limited other than by the claims appended hereto.

I claim:

1. In a brake, a backing plate, a pair of shoes having beveled ends, a rocking member pivotally mounted on the backing plate and extending inwardly from said mounting and disposed between adjacent ends of said shoes and having opposite parts movable toward or away from each other and engaging said beveled ends.

2. In a brake, the combination of a pair of shoes, anchoring means disposed between adjacent ends of the shoes, and a member comprising two oppositely facing wedge parts mounted on a fixed pivot and disposed between the other ends of said shoes and adapted to be rocked to transmit force from one shoe to another and to adjust the spacing between shoes.

3. In a brake, the combination of a pair of channel shaped shoes with inturned side flanges at adjacent ends, an anchor disposed between other adjacent ends of said shoes, expanding means positioned near said anchor, and a free rocking cam positioned between the first adjacent ends of said shoes and comprising axially adjustable parts engaging said inturned side flanges.

4. In a brake, the combination of a pair of shoes, each anchored at one end, and having cam engaging surfaces at their free ends, and a cam pivotally mounted and disposed between the free ends of said shoes and adapted to be rocked by circumferential movement of said shoes, said cam comprising adjustably positioned parts for spacing the free ends of said shoes, whereby the ratio of the force transmitted from one shoe to another depends upon the character of the cam faces engaged by the free ends of said shoes and whereby compensation for wear of said shoes may be had through said cam.

5. In a brake, the combination of a servo shoe, and a served shoe, both shoes being channeled and having inturned side flanges at least at adjacent ends, and a rocking cam disposed between the free ends of said shoe and contacting with said inturned side flanges, said cam being mounted on a fixed pivot and having shoe engaging surfaces spaced from said pivot, whereby the force delivered to the served shoe may be greater or less than the force delivered by the servo shoe according to the ratio of the distance between the points of contact of said shoes to said pivot point.

6. In a plural shoe brake the combination of a backing plate and a plurality of shoes, at least two shoes having their adjacent ends beveled, and means pivotally mounted on the backing plate and engaging the beveled ends of the shoes for adjusting the spacing between the said beveled ends of the shoes and movable circumferentially with said shoes.

7. A plural brake having shoes channelled in cross-section and each shoe having an arcuate lining supporting part and inwardly extending side flanges, the said flanges extending beyond the lining supporting part at the free ends of adjacent shoes and being turned inwardly to present inclined surfaces, and means engaging said inclined surfaces for spacing the shoes apart.

8. A brake, the combination of a brake drum, a backing plate, an anchor pin secured to the backing plate and providing an arcuate surface to adjacent ends of shoes anchorable thereon, a pair of channel shaped shoes having inwardly extending side flanges and having an arcuate bearing surface engaging said anchor pin at one end of each shoe, the other ends of the shoes having the said flanges inturned to provide a bearing surface inclined to radial planes, and means engaging said last named surfaces for spacing the shoes apart and transmitting force from one shoe to the other when the brake is applied.

In testimony whereof, I hereunto affix my signature.

JOHN SNEED.